US011856637B2

(12) United States Patent
Sebire et al.

(10) Patent No.: US 11,856,637 B2
(45) Date of Patent: Dec. 26, 2023

(54) SEARCH SPACE AND DRX CYCLE LINKING AND MODIFICATION

(71) Applicant: Nokia Technologies Oy, Espoo (FI)

(72) Inventors: Benoist P. Sebire, Tokyo (JP);
Rapeepat Ratasuk, Inverness, IL (US)

(73) Assignee: Nokia Technologies Oy, Espoo (FI)

( * ) Notice: Subject to any disclaimer, the term of this patent is extended or adjusted under 35 U.S.C. 154(b) by 44 days.

(21) Appl. No.: 17/121,017

(22) Filed: Dec. 14, 2020

(65) Prior Publication Data

US 2022/0191964 A1 Jun. 16, 2022

(51) Int. Cl.
| | |
|---|---|
| *H04W 76/28* | (2018.01) |
| *H04L 1/00* | (2006.01) |
| *H04W 72/0446* | (2023.01) |
| *H04W 72/0453* | (2023.01) |
| *H04W 72/23* | (2023.01) |

(52) U.S. Cl.
CPC .......... *H04W 76/28* (2018.02); *H04L 1/0038* (2013.01); *H04W 72/0446* (2013.01); *H04W 72/0453* (2013.01); *H04W 72/23* (2023.01)

(58) Field of Classification Search
CPC ............... H04W 76/28; H04W 72/042; H04W 72/0446; H04W 72/0453; H04W 52/0216; H04L 1/0038
See application file for complete search history.

(56) References Cited

U.S. PATENT DOCUMENTS

| | | | | |
|---|---|---|---|---|
| 2011/0205978 | A1* | 8/2011 | Nory | H04L 5/0007 370/329 |
| 2020/0413410 | A1* | 12/2020 | Zhou | H04W 72/0493 |
| 2021/0235469 | A1* | 7/2021 | Mu | H04L 5/0048 |

FOREIGN PATENT DOCUMENTS

| | | |
|---|---|---|
| EP | 3 651 506 A2 | 5/2020 |
| EP | 3 934 355 A1 | 1/2022 |
| WO | WO-2019/199880 A1 | 5/2019 |
| WO | WO-2020/204484 A1 | 10/2020 |

OTHER PUBLICATIONS

"New SID on support of reduced capability NR device", Ericsson, 3GPP TSG RAN Meeting #86, R-193238, Dec. 2019, 5 pages.
(Continued)

*Primary Examiner* — Dady Chery
(74) *Attorney, Agent, or Firm* — Harrington & Smith

(57) ABSTRACT

A network node links search spaces, used by a UE to monitor a control channel for control information for the UE, to an on-duration period of a DRX cycle. Resources of one or both of time-frequency resources or periodicity resources for the search spaces are modified via the linking over the on-duration period. The network node configures the UE so the user equipment implements the modified resources during the on-duration period as the user equipment searches the search spaces. A UE receives configuration, defined so the UE implements modification of resources during an on-duration period of a DRX cycle as the UE searches search spaces during the on-duration period. The resources are one or both of time-frequency resources or periodicity resources. The UE monitors the modified search spaces over the on-duration period, as the UE searches a control channel for control information.

20 Claims, 14 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 16)". 3GPP TS 38.300 V16.3.0, Sep. 2020, 148 pgs.
"3rd Generation Partnership Project; Technical Specification Group Radio Access Network; NR; Medium Access Control (MAC) protocol specification (Releae 16)", 3 GPP TS 38.321 V16.2., Sep. 2020, 154 pgs.
"3rd Generation Partnership Project; Technical Specification Group Radio Access Network; NR; Radio Resource Control (RRC) protocol specification (Release 16)", 3GPP TS 38.331 V16.2.0, Sep. 2020, 921 pgs.
"Discussion on DCI-based power saving techniques", Samsung, 3GPP TSG RAN WGl #103-e, R1-2008177, Oct. 26-Nov. 13, 2020, 8 pages.

* cited by examiner

```
-- ASN1START
-- TAG-CONTROLRESOURCESET-START

ControlResourceSet ::=        SEQUENCE {
    controlResourceSetId          ControlResourceSetId,
    frequencyDomainResources      BIT STRING (SIZE (45)),
    duration                      INTEGER (1..maxCoReSetDuration),
    cce-REG-MappingType           CHOICE {
        interleaved                   SEQUENCE {
            reg-BundleSize                ENUMERATED {n2, n3, n6},
            interleaverSize               ENUMERATED {n2, n3, n6},
            shiftIndex                    INTEGER (0..maxNrofPhysicalResourceBlocks-1)   OPTIONAL  -- Need S
        },
        nonInterleaved                NULL
    },
    precoderGranularity           ENUMERATED {sameAsREG-bundle, allContiguousRBs},
    tci-StatesPDCCH-ToAddList     SEQUENCE (SIZE (1..maxNrofTCI-StatesPDCCH)) OF TCI-StateId
                                                                              OPTIONAL, -- Cond NotSIB1-initialBWP
    tci-StatesPDCCH-ToReleaseList SEQUENCE (SIZE (1..maxNrofTCI-StatesPDCCH)) OF TCI-StateId
                                                                              OPTIONAL, -- Cond NotSIB1-initialBWP
    tci-PresentInDCI              ENUMERATED {enabled}                        OPTIONAL, -- Need S
    pdcch-DMRS-ScramblingID       INTEGER (0..65535)                          OPTIONAL, -- Need S
    ...,
    [[
    rb-Offset-r16                 INTEGER (0..5)                              OPTIONAL, -- Need S
    tci-PresentDCI-1-2-r16        INTEGER (1..3)                              OPTIONAL, -- Need S
    coresetPoolIndex-r16          INTEGER (0..1)                              OPTIONAL, -- Need S
    controlResourceSetId-v1610    ControlResourceSetId-v1610                  OPTIONAL  -- Need S
    ]]
}

-- TAG-CONTROLRESOURCESET-STOP
-- ASN1STOP
```

FIG.4A

DURATION
CONTIGUOUS TIME DURATION OF THE CORESET IN NUMBER OF SYMBOLS (SEE TS 38.211 [16], CLAUSE 7.3.2.2)

frequencyDomainResources
FREQUENCY DOMAIN RESOURCES FOR THE CORESET. EACH BIT CORRESPONDS A GROUP OF 6 RBs, WITH GROUPING STARTING FROM THE FIRST RB GROUP IN THE BWP. WHEN AT LEAST ONE SEARCH SPACE IS CONFIGURED WITH freqMonitorLocation-r16, ONLY THE FIRST $??_{RBG,set0}^{size}$ BITS ARE VALID (SEE TS 38.213 [13], CLAUSE 10.1). THE FIRST (LEFT-MOST/MOST SIGNIFICANT) BIT CORRESPONDS TO THE FIRST RB GROUP IN THE BWP, AND SO ON. A BIT THAT IS SET TO 1 INDICATES THAT THIS RB GROUP BELONGS TO THE FREQUENCY DOMAIN RESOURCE OF THIS CORESET. BITS CORRESPONDING TO A GROUP OF RBs NOT FULLY CONTAINED IN THE BANDWIDTH PART WITHIN WHICH THE CORESET IS CONFIGURED ARE SET TO ZERO (SEE TS 38.211 [16], CLAUSE 7.3.2.2)

FIG.4B

```
-- ASN1START
-- TAG-SEARCHSPACE-START

SearchSpace ::=              SEQUENCE {
    searchSpaceId                SearchSpaceId,
    controlResourceSetId         ControlResourceSetId,
    monitoringSlotPeriodicityAndOffset   CHOICE {
        sl1                          NULL,
        sl2                          INTEGER (0..1),
        sl4                          INTEGER (0..3),
        sl5                          INTEGER (0..4),
        sl8                          INTEGER (0..7),
        sl10                         INTEGER (0..9),
        sl16                         INTEGER (0..15),
        sl20                         INTEGER (0..19),
        sl40                         INTEGER (0..39),
        sl80                         INTEGER (0..79),
        sl160                        INTEGER (0..159),
        sl320                        INTEGER (0..319),
        sl640                        INTEGER (0..639),
        sl1280                       INTEGER (0..1279),
        sl2560                       INTEGER (0..2559),
    }                                                         OPTIONAL,   -- Cond SetupOnly
    duration                     INTEGER (2..2559)
    monitoringSymbolsWithinSlot  BIT STRING (SIZE (14))
    nrofCandidates               SEQUENCE {
        aggregationLevel1            ENUMERATED {n0, n1, n2, n3, n4, n5, n6 n8},
        aggregationLevel2            ENUMERATED {n0, n1, n2, n3, n4, n5, n6 n8},
```

OPTIONAL,   -- Cond Setup
OPTIONAL,   -- Need R
OPTIONAL,   -- Cond Setup

FIG.4D1

| FIG.4D1 |
| FIG.4D2 |

FIG.4D

```
        aggregationLevel4            ENUMERATED {n0, n1, n2, n3, n4, n5, n6 n8},
        aggregationLevel8            ENUMERATED {n0, n1, n2, n3, n4, n5, n6 n8},
        aggregationLevel16           ENUMERATED {n0, n1, n2, n3, n4, n5, n6 n8}
    }
    searchSpaceType            CHOICE {
        common                     SEQUENCE {
            dci-Format0-0-AndFormat1-0    SEQUENCE {

} OPTIONAL,   -- Cond Setup
            ...
            dci-Format2-0              SEQUENCE {
                nprofCandidates-SFI        SEQUENCE {
                    aggregationLevel1          ENUMERATED {n1, n2}  OPTIONAL,  -- Need R
                    aggregationLevel2          ENUMERATED {n1, n2}  OPTIONAL,  -- Need R
                    aggregationLevel4          ENUMERATED {n1, n2}  OPTIONAL,  -- Need R
                    aggregationLevel8          ENUMERATED {n1, n2}  OPTIONAL,  -- Need R
                    aggregationLevel16         ENUMERATED {n1, n2}  OPTIONAL,  -- Need R
```

FIG. 4D2

```
    ...
    },
    dci-Format2-1         SEQUENCE {                                                    OPTIONAL,  -- Need R
        ...
    },
    dci-Format2-2         SEQUENCE {                                                    OPTIONAL,  -- Need R
        ...
    },
    dci-Format2-3         SEQUENCE {                                                    OPTIONAL,  -- Need R
        dummy1            ENUMERATED {sl1, sl2, sl4, sl5, sl8, sl10, sl16, sl20}        OPTIONAL,  -- Cond Setup
        dummy2            ENUMERATED {n1, n2},
        ...
    },
    ue-Specific           SEQUENCE {                                                    OPTIONAL,  -- Need R
        dci-Formats       ENUMERATED {formats0-0-And-1-0, formats0-1-And-1-1},
        ...,
        [[
        dci-Formats-MT-r16    ENUMERATED {formats2-5}                                           OPTIONAL,  -- Need R
        dci-FormatsSL-r16     ENUMERATED {formats0-0-And-1-0, formats0-1-And-1-1, formats3-0,
                                           formats3-1, formats3-0-And-3-1}                     OPTIONAL,  -- Need R
        dci-FormatsExt-r16    ENUMERATED {formats0-2-And-1-2, formats0-1-And-1-1And-0-2-And-1-2}
                                                                                                OPTIONAL,  -- Need R
        ]]
    },
    ...
```

FIG.4E

```
SearchSpaceExt-r16       SEQUENCE {
  controlResourceSetId-r16    ControlResourceSetId-r16   OPTIONAL,  -- Cond SetupOnly2
  searchSpaceType-r16     SEQUENCE {
    comon-r16       SEQUENCE {
      dci-Format2-4-r16     SEQUENCE {
        nrofCandidates-CI-r16    SEQUENCE {
          aggregationLevel1-r16    ENUMERATED {n1, n2}   OPTIONAL,  -- Need R
          aggregationLevel2-r16    ENUMERATED {n1, n2}   OPTIONAL,  -- Need R
          aggregationLevel4-r16    ENUMERATED {n1, n2}   OPTIONAL,  -- Need R
          aggregationLevel8-r16    ENUMERATED {n1, n2}   OPTIONAL,  -- Need R
          aggregationLevel16-r16   ENUMERATED {n1, n2}   OPTIONAL,  -- Need R
        }                        OPTIONAL,  -- Need R
        ...
      dci-Format2-5-r16     SEQUENCE {
        nrofCandidates-IAB-r16    SEQUENCE {
          aggregationLevel1-r16    ENUMERATED {n1, n2}   OPTIONAL,  -- Need R
          aggregationLevel2-r16    ENUMERATED {n1, n2}   OPTIONAL,  -- Need R
          aggregationLevel4-r16    ENUMERATED {n1, n2}   OPTIONAL,  -- Need R
          aggregationLevel8-r16    ENUMERATED {n1, n2}   OPTIONAL,  -- Need R
          aggregationLevel16-r16   ENUMERATED {n1, n2}   OPTIONAL,  -- Need R
        }                        OPTIONAL,  -- Need R
        ...
      dci-Format2-6-r16     SEQUENCE {      OPTIONAL,  -- Need R
        ...
      }
  searchSpaceGroupIdList-r16  SEQUENCE (SIZE (1..2)) OF INTEGER (0..1)  OPTIONAL,  -- Cond Setup3
  freqMonitorLocations-r16    BIT STRING (SIZE (5))                     OPTIONAL,  -- Need R
                                                                        OPTIONAL,  -- Need R
  ...
-- TAG-SEARCHSPACE-STOP
-- ASN1STOP
```

FIG.4F

DURATION
NUMBER OF CONSECUTIVE SLOTS THAT A SearchSpace LASTS IN EVERY OCCASION, i.e., UPON EVERY PERIOD AS GIVEN IN THE periodicityAndOffset. IF THE FIELD IS ABSENT, THE UE APPLIES THE VALUE 1 SLOT, EXCEPT FOR DCI FORMAT 2_0. THE UE IGNORES THIS FIELD FOR DCI FORMAT 2_0. THE MAXIMUM VALID DURATION IS PERIODICITY-1 (PERIODICITY AS GIVEN IN THE minitoringSlotPeriodicityAndOffset)

monitoringSlotPeriodicityAndOffset
SLOTS FOR PDCCH MONITORING CONFIGURED AS PERIODICITY AND OFFSET. IF THE UE IS CONFIGURED TO MONITOR DCI FORMAT 2_1, ONLY THE VALUES 'sl1', 'sl2' OR 'sl4' ARE APPLICABLE. IF THE UE IS CONFIGURED TO MONITOR DCI FORMAT 2_0, ONLY THE VALUES 'sl1', 'sl2', 'sl4', 'sl5', 'sl8', 'sl10', 'sl16', AND 'sl20' ARE APPLICABLE (SEE TS 38.213 [13], CLAUSE 10)

monitoringSymbolsWithinSlot
THE FIRST SYMBOL(S) FOR PDCCH MONITORING IN THE SLOTS CONFIGURED FOR PDCCH MONITORING (SEE monitoringSlotPeriodicityAndOffset AND DURATION). THE MOST SIGNIFICANT (LEFT) BIT REPRESENTS THE FIRST OFDM IN A SLOT, AND THE SECOND MOST SIGNIFICANT (LEFT) BIT REPRESENTS THE SECOND OFDM SYMBOL IN A SLOT AND SO ON. THE BIT(S) SET TO ONE IDENTIFY THE FIRST OFDM SYMBOL(S) OF THE CONTROL RESOURCE SET WITHIN A SLOT. IF THE CYCLIC PREFIX OF THE BWP IS SET TO EXTENDED CP, THE LAST TWO BITS WITHIN THE BIT STRING SHALL BE IGNORED BY THE UE. FOR DCI FORMAT 2_0, THE FIRST ONE SYMBOL APPLIES IF THE DURATION OF CORESET (IN THE IE ControlResourceSet) IDENTIFIED BY controlResourceSetId INDICATES 3 SYMBOLS, THE FIRST TWO SYMBOLS APPLY IF THE DURATION OF CORESET IDENTIFIED BY controlResourceSetId INDICATES 2 SYMBOLS, AND THE FIRST THREE SYMBOLS APPLY IF THE DURATION OF CORESET IDENTIFIED BY controlResourceSetId INDICATES 1 SYMBOL
SEE TS 38.213 [13], CLAUSE 10

FIG.4G

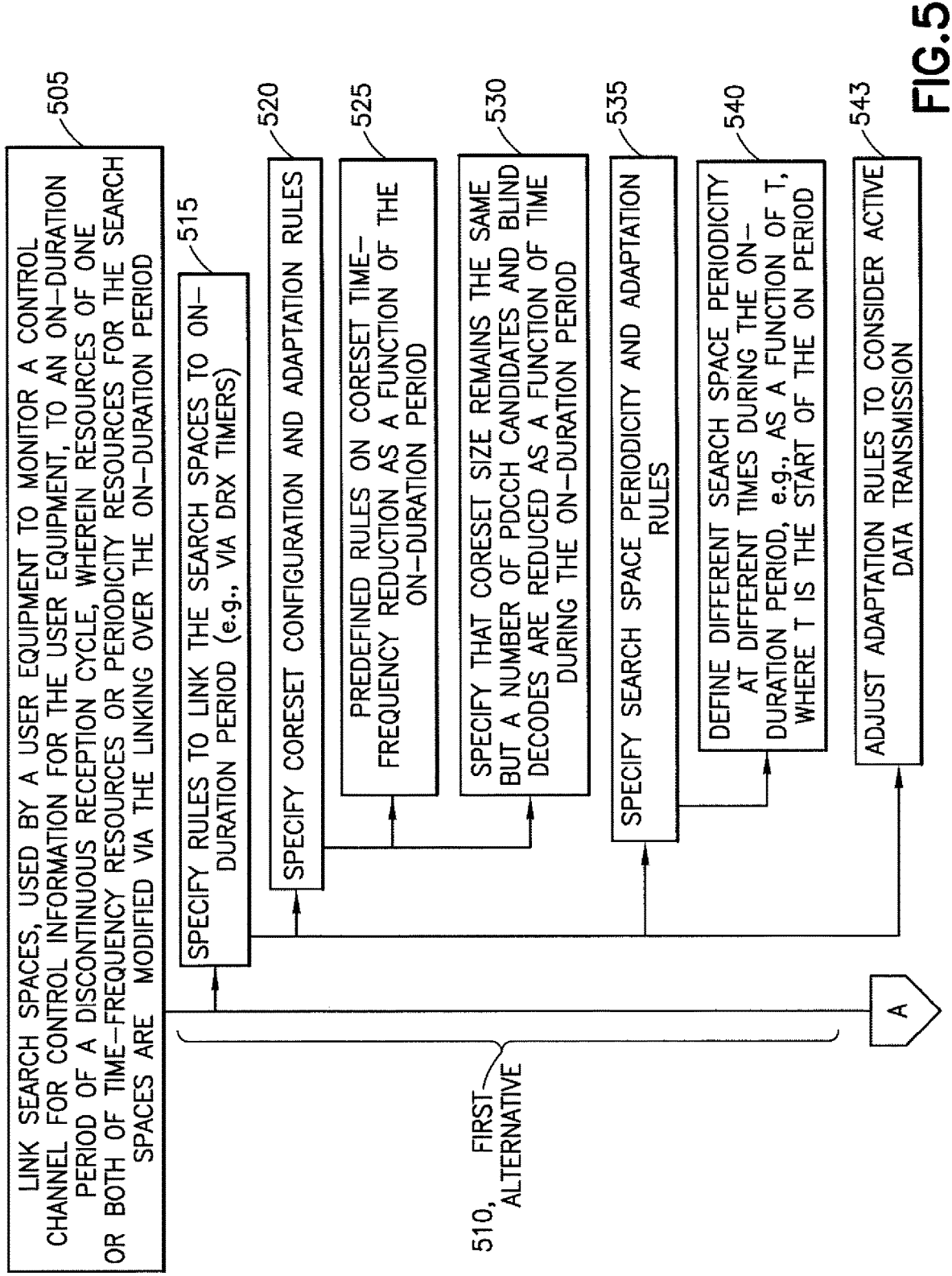

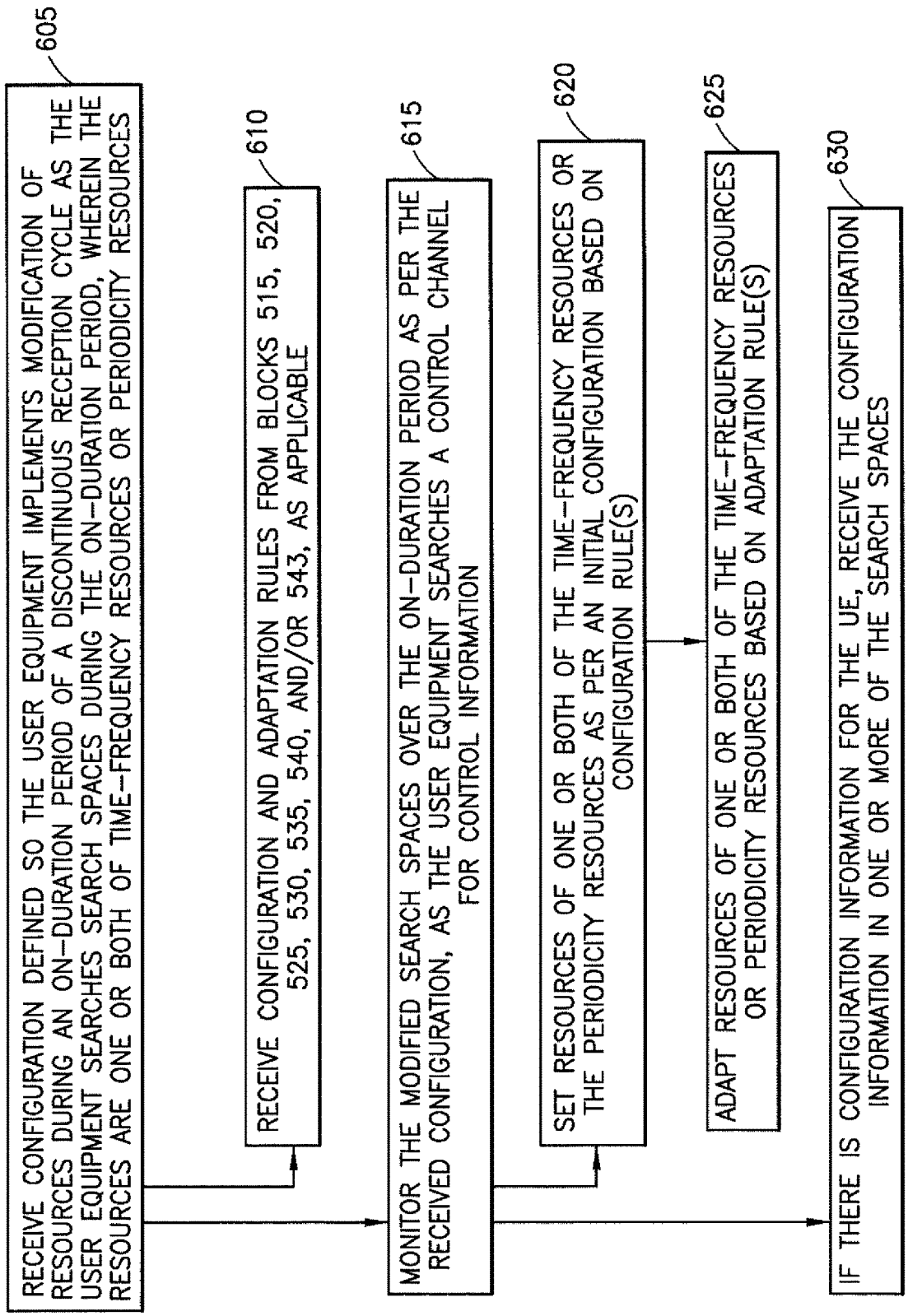

SEARCH SPACE AND DRX CYCLE LINKING AND MODIFICATION

TECHNICAL FIELD

Exemplary embodiments herein relate generally to wireless communications and discontinuous reception and, more specifically, relates to use of search spaces for a DRX cycle.

BACKGROUND

Discontinuous Reception (DRX) is a technique used to save power consumption and battery on a User Equipment (UE), which is a wireless device that connects to a wireless network. In normal operation, the UE has to be "awake" all the time, e.g., to monitor the physical downlink control channel (PDCCH) for every slot or subframe. This is a power consumption issue for the UE. If UE is always awake, even when there is no data being transmitted to it from the network, the UE wastes energy.

To address this, one of the most common ways is to use DRX. DRX is a mechanism in which UE gets into sleep mode for a certain period of time and wakes up for another period of time. The time the UE is awake is coordinated with PDCCH monitoring times.

The UE monitors search spaces on the PDCCH during the times the UE is awake and accessing the PDCCH.

BRIEF SUMMARY

This section is intended to include examples and is not intended to be limiting.

In an exemplary embodiment, a method is disclosed that includes linking, by a network node in a wireless network, search spaces, used by a user equipment to monitor a control channel for control information for the user equipment, to an on-duration period of a discontinuous reception cycle. The resources of one or both of time-frequency resources or periodicity resources for the search spaces are modified via the linking over the on-duration period. The method also includes configuring, by the network node, the user equipment so the user equipment implements the modified resources during the on-duration period as the user equipment searches the search spaces.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: link, by a network node in a wireless network, search spaces, used by a user equipment to monitor a control channel for control information for the user equipment, to an on-duration period of a discontinuous reception cycle, wherein resources of one or both of time-frequency resources or periodicity resources for the search spaces are modified via the linking over the on-duration period; and configure, by the network node, the user equipment so the user equipment implements the modified resources during the on-duration period as the user equipment searches the search spaces.

An exemplary computer program product includes a computer-readable storage medium bearing computer program code embodied therein for use with a computer. The computer program code includes: code for linking, by a network node in a wireless network, search spaces, used by a user equipment to monitor a control channel for control information for the user equipment, to an on-duration period of a discontinuous reception cycle, wherein resources of one or both of time-frequency resources or periodicity resources for the search spaces are modified via the linking over the on-duration period; and code for' configuring, by the network node, the user equipment so the user equipment implements the modified resources during the on-duration period as the user equipment searches the search spaces.

In another exemplary embodiment, an apparatus comprises means for performing: linking, by a network node in a wireless network, search spaces, used by a user equipment to monitor a control channel for control information for the user equipment, to an on-duration period of a discontinuous reception cycle, wherein resources of one or both of time-frequency resources or periodicity resources for the search spaces are modified via the linking over the on-duration period; and configuring, by the network node, the user equipment so the user equipment implements the modified resources during the on-duration period as the user equipment searches the search spaces.

In an exemplary embodiment, a method is disclosed that includes receiving configuration, at a user equipment and from a base station in a wireless network, defined so the user equipment implements modification of resources during an on-duration period of a discontinuous reception cycle as the user equipment searches search spaces during the on-duration period. The resources are one or both of time-frequency resources or periodicity resources. The method includes monitoring by the user equipment the modified search spaces over the on-duration period, as the user equipment searches a control channel for control information.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive configuration, at a user equipment and from a base station in a wireless network, defined so the user equipment implements modification of resources during an on-duration period of a discontinuous reception cycle as the user equipment searches search spaces during the on-duration period, wherein the resources are one or both of time-frequency resources or periodicity resources; and monitor by the user equipment the modified search spaces over the on-duration period, as the user equipment searches a control channel for control information.

An exemplary computer program product includes a computer-readable storage medium bearing computer program code embodied therein for use with a computer. The computer program code includes: code for receiving configuration, at a user equipment and from a base station in a wireless network, defined so the user equipment implements modification of resources during an on-duration period of a discontinuous reception cycle as the user equipment searches search spaces during the on-duration period, wherein the resources are one or both of time-frequency resources or periodicity resources; and code for monitoring by the user equipment the modified search spaces over the on-duration period, as the user equipment searches a control channel for control information.

In another exemplary embodiment, an apparatus comprises means for performing: receiving configuration, at a user equipment and from a base station in a wireless network, defined so the user equipment implements modification of resources during an on-duration period of a discontinuous reception cycle as the user equipment searches search spaces during the on-duration period, wherein the resources are one or both of time-frequency resources or periodicity resources; and monitoring by the user equipment the modified search spaces over the on-duration period, as the user equipment searches a control channel for control information.

BRIEF DESCRIPTION OF THE DRAWINGS

In the attached Drawing Figures:

FIG. 4A illustrates the IE ControlResourceSet, which is used to configure a time/frequency control resource set (CORESET) in which to search for downlink control information;

FIG. 4B illustrates two ControlResourceSet field descriptions applicable to the exemplary embodiments herein;

FIGS. 4D, 4E, and 4F illustrate the IE SearchSpace;

FIG. 4G illustrates three SearchSpace field descriptions applicable to exemplary embodiments herein;

FIG. 6 is a logic flow diagram performed by a user equipment for search space and DRX cycle linking and modification, and illustrates the operation of an exemplary method or methods, a result of execution of computer program instructions embodied on a computer readable memory, functions performed by logic implemented in hardware, and/or interconnected means for performing functions in accordance with exemplary embodiments.

DETAILED DESCRIPTION OF THE DRAWINGS

Figure 1:
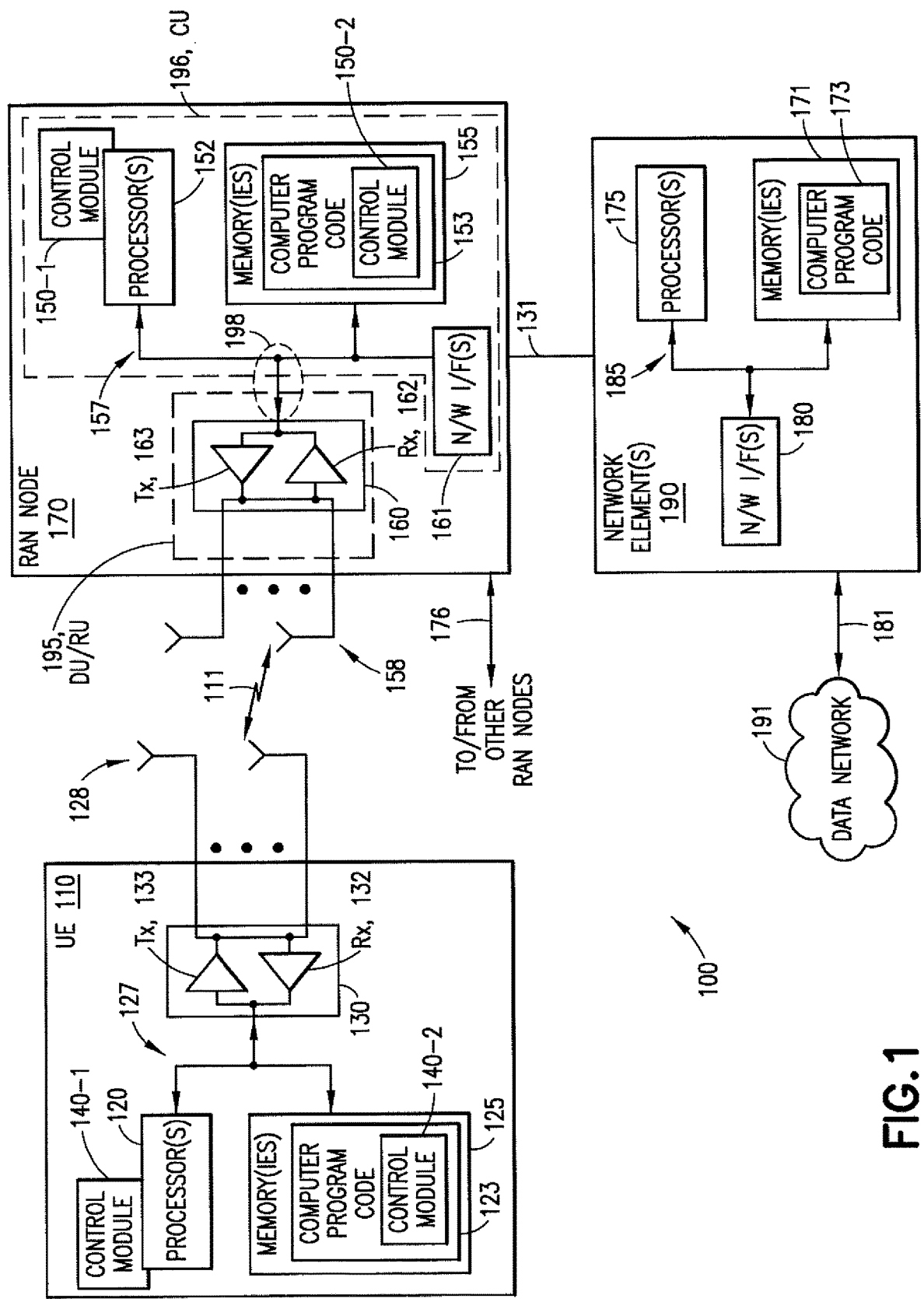
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

In the examples herein, a reference number without a dashed number is a general version of an item, and a reference number with a dashed number is one (e.g., more specific) example of that item. For instance, an Item 10 is a general version of the Item, whereas Item 10-1 or Item 10-2 are examples of that particular Item.

The exemplary embodiments herein describe techniques for search space and DRX cycle linking and modification. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as, e.g., a gNB. A gNB is a node providing NR user plane and control plane protocol terminations towards the UE, and connected via the NG interface to a 5GC (e.g., the network element(s) 190). The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB, and its operation is partly controlled by gNB-CU. One gNB-CU supports one or multiple cells. One cell may be supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a distributed unit (DU) 195 for gNB implementation for 5G, with the other elements of the RAN node 170 possibly being physically in a different location from the DU, and the one or more buses 157 could be implemented in part as, e.g., fiber optic cable or other suitable network connection to connect the other elements (e.g., a central unit (CU), gNB-CU) of the RAN node 170. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering a third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane, functions (UPF(s)) and/or session management function(s) (SMF(s)). These are merely exemplary functions that may be supported by the network element(s) 190, and note that at least 5G functions, and possibly other functions (such as LTE), might be supported. The RAN node 170 is coupled via a link 131 to a network element 190. The link 131 may be implemented as, e.g., an NG interface for 5G, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions.

The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

As described above, the exemplary embodiments herein relate at least in part to DRX. An overview of DRX is given in 3GPP TS 38.300. A quotation from this TS starts immediately below.

The PDCCH monitoring activity of the UE in RRC connected mode is governed by DRX and BA.

When DRX is configured, the UE does not have to continuously monitor PDCCH. DRX is characterized by the following:
  on-duration: duration that the UE waits for, after waking up, to receive PDCCHs. If the UE successfully decodes a PDCCH, the UE stays awake and starts the inactivity timer;
  inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);
  retransmission-timer: duration until a retransmission can be expected;
  cycle: specifies the periodic repetition of the on-duration followed by a possible period of inactivity (see FIG. 2);
  active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

When BA is configured, the UE only has to monitor PDCCH on the one active BWP i.e. it does not have to monitor PDCCH on the entire DL frequency of the cell. A BWP inactivity timer (independent from the DRX inactivity-timer described above) is used to switch the active BWP to the default one: the timer is restarted upon successful PDCCH decoding and the switch to the default BWP takes place when it expires.

Figure 2:
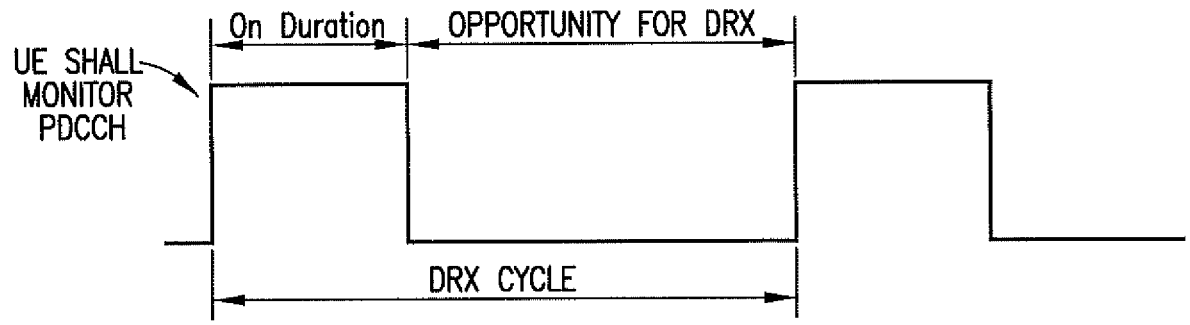
FIG. 2 illustrates a DRX cycle.

This ends the quoted part of 3GPP TS 38.300. FIG. 2 illustrates a DRX cycle and is a copy of FIG. 11-1 from 3GPP TS 38.300. This figure shows a DRX cycle, when the UE shall monitor the PDCCH, an on-duration period for the DRX cycle, and an opportunity for DRX period.

The details of DRX are specified in 3GPP TS 38.321, some of which are repeated below. The references and italics are in the original text. A quotation from this TS starts immediately below.

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:
  drx-onDurationTimer: the duration at the beginning of a DRX Cycle;
  drx-SlotOffset: the delay before starting the drx-onDurationTimer;
  drx-InactivityTimer: the duration after the PDCCH occasion in which a PDCCH indicates a new UL or DL transmission for the MAC entity;
  drx-RetransmissionTimerDL (per DL HARQ process except for the broadcast process): the maximum duration until a DL retransmission is received;
  drx-RetransmissionTimerUL (per UL HARQ process): the maximum duration until a grant for UL retransmission is received;
  drx-LongCycleStartOffset: the Long DRX cycle and drx-StartOffset which defines the subframe where the Long and Short DRX Cycle starts;
  drx-ShortCycle (optional): the Short DRX cycle;
  drx-ShortCycleTimer (optional): the duration the UE shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity.

This ends the quoted part of 3GPP TS 38.321.

An overview of the Physical Downlink Control Channel (PDCCH) is given in 3GPP TS 38.300 and is repeated below. A quotation from this TS starts immediately below.

The Physical Downlink Control Channel (PDCCH) can be used to schedule DL transmissions on PDSCH and UL transmissions on PUSCH, where the Downlink Control Information (DCI) on PDCCH includes:
  Downlink assignments containing at least modulation and coding format, resource allocation, and hybrid-ARQ information related to DL-SCH;
  Uplink scheduling grants containing at least modulation and coding format, resource allocation, and hybrid-ARQ information related to UL-SCH.
  In addition to scheduling, PDCCH can be used to for
  Activation and deactivation of configured PUSCH transmission with configured grant;

Activation and deactivation of PDSCH semi-persistent transmission;

Notifying one or more UEs of the slot format;

Notifying one or more UEs of the PRB(s) and OFDM symbol(s) where the UE may assume no transmission is intended for the UE;

Transmission of TPC commands for PUCCH and PUSCH;

Transmission of one or more TPC commands for SRS transmissions by one or more UEs;

Switching a UE's active bandwidth part;

Initiating a random access procedure.

A UE monitors a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH.

Each resource element group carrying PDCCH carries its own DMRS.

QPSK modulation is used for PDCCH.

This ends the quoted part of 3GPP TS 38.300.

The PDCCH search space refers to the area in the downlink resource grid where PDCCH may be carried in one or more CORESETs. Throughout the search space, the UE performs blind decoding, trying to find PDCCH. The larger the search space, the more processing and the higher the power consumption for the UE.

A Reduced capability (RedCap) UE will likely be standardized in Rel-17 (study item RP-193238 is currently on-going). See Ericsson, "New SID on support of reduced capability NR devices", RP-193238, 3GPP TSG RAN Meeting #86, Sitges, Spain, Dec. 9-12, 2019. One objective from the SI is to study UE power saving: "Study UE power saving and battery lifetime enhancement for reduced capability UEs in applicable use cases (e.g. delay tolerant) [RAN2, RAN1]: Reduced PDCCH monitoring by smaller numbers of blind decodes and CCE limits [RAN1]."

One main problem in this area lies in managing the search space to find a good balance between, on one side, the power consumption at the UE linked to the amount of blind decodes and, on the other side, the scheduling flexibility for the network:

1) The larger in the frequency domain the search space, and the more frequent in the time domain, the higher the battery consumption;
2) The smaller the search space in the frequency domain, the more limited the network becomes in allocating appropriate resources to the UE;
3) The less frequent the search space occurs, the more delays are introduced; and/or
4) The smaller the search space in the frequency domain and the less frequent the search space occurs, the smaller the trunking gains.

Figure 3:
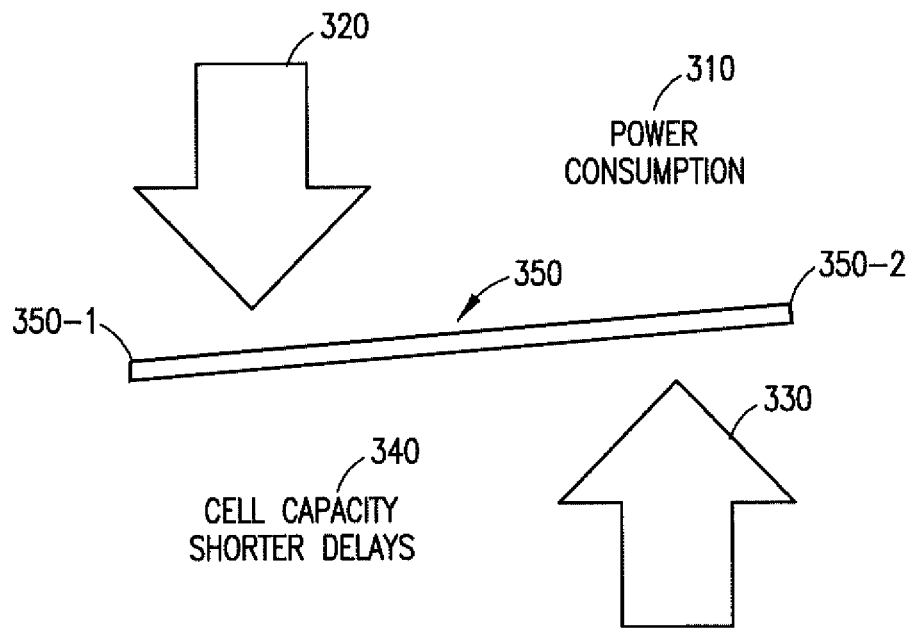
FIG. 3 provides a visual representation of the conflict between power consumption at a UE and scheduling flexibility for the network.

This is illustrated in part by FIG. 3, which provides a visual representation of the conflict between power consumption 310 at a UE and scheduling flexibility 340 for the network. The scheduling flexibility in this example includes cell capacity and shorter delays. The line 350 represents what happens in this conflict. As can be seen, as the power consumption 310 decreases (arrow 320), the end 350-1 of the line 350 indicates the scheduling flexibility 340 decreases. In other words, cell capacity decreases and/or there are longer delays. As can be seen, as the scheduling flexibility increases (arrow 330), the end 350-2 of the line 350 indicates the power consumption 310 increases. In other words, cell capacity increases and/or there are shorter delays.

Currently, a UE can perform dynamic switching between two different search spaces. That is, a UE can be configured with two different search spaces and dynamically switch between based on DCI. This, however, does not address the main problem described above.

By contrast, the exemplary embodiments herein address at least the main problem. In particular, exemplary embodiments herein link the adaptive search space (e.g., its width in the frequency domain, and at least periodicity in the time domain) to the on-duration of the DRX cycle (or, more generally, to the DRX cycle in general), using one or both of the following.

1) A largest search space (e.g., a larger CORESET configuration) at the beginning of the on-duration (or the DRX cycle) is chosen, and the search space then shrinks. This is characterized as a width of the search space (e.g. as given by the number of physical resource blocks). Note the larger the CORESET, the more scheduling opportunities and the less blocking probability (i.e., the probability that the UE cannot be scheduled due to gNB scheduling other UEs), but also the higher the power consumption.
2) A faster periodicity in the search space (i.e., shorter time between search spaces or start of search spaces or other shorter periodicity) occurs at the beginning of the on-duration (or the DRX cycle), which then slows down in periodicity (i.e., a longer time between search spaces or start of search spaces or other longer periodicity).

The link can have multiple alternatives, as follows:

1) A first alternative: the search space configuration is linked, e.g., to DRX timers (see, e.g., the timers such as drx-onDurationTimer and drx-ShortCycleTimer, along with other timers, from the previously quoted section of 3GPP TS 38.321), the decrease in width of a search in the frequency domain or periodicity is explicitly configured (e.g., via coefficients, timers, or the like); or
2) A second alternative: more than one search space is configured to match the DRX cycle and the changes (e.g., in periodicity and width of a search in the frequency domain) from one search space to another search space creates results that are implicitly configured.

In more detail, for the first alternative, the UE is configured by the gNB 170 with parameters to adapt the search space (e.g., via adaption rules relying on those parameters). For instance, the UE 110 may be provided with one search space configuration and also parameters to inform the UE how that search space changes within the DRX cycle.

For the second alternative, the UE 110 is supplied by the gNB 170 with multiple configurations (but no parameters or corresponding adaptation rules). In contrast with the first alternative, the UE does not know the search space is changing, as this will be handled by the network. For example, the network can configure a first search space configuration to apply at the beginning of the DRX cycle, and a second search space configuration to apply at the end of the DRX cycle, where the second configuration has a smaller width in the frequency domain and/or a slower periodicity than the first search space configuration has.

The first alternative can be thought of as being explicit (from the point of view of the UE), as UE 110 uses the parameters (or their corresponding adaptation rules) to adapt the search space on its own. Meanwhile, the second alternative can be thought of as being implicit from the point of view of the UE, as the UE 110 is configured with the search configuration, but has no parameters (or their corresponding adaptation rules), so does not adapt the search space on its own.

Figure 4:
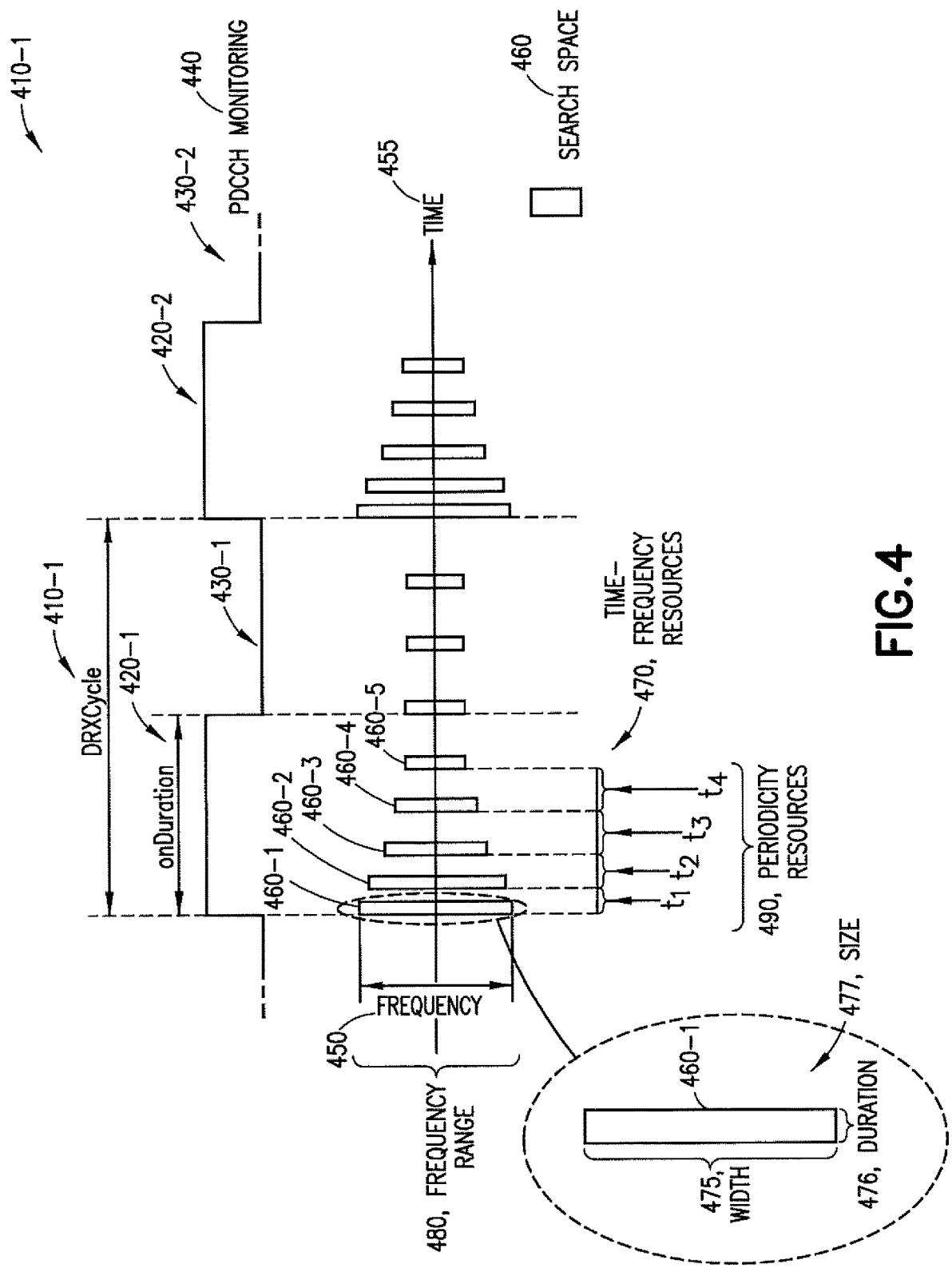
FIG. 4 is an illustration of search space and DRX cycle linking and modification in time and frequency domains for DRX cycles, in accordance with multiple exemplary embodiments.

FIG. 4 is an illustration of search space and DRX cycle linking and modification in a time and frequency domains for DRX cycles, in accordance with multiple exemplary embodiments. In the examples of FIG. 4, both of the following are illustrated: (a) a larger CORESET size (e.g., given by the number of OFDM symbols and/or by the number of resource blocks) occurs at the start of the on-duration that decreases over the time period of the on-duration, and (b) more frequent periodicity occurs at the start in time of the on-duration and a less frequent periodicity is used over the time period of the on-duration. While both (a) and (b) are illustrated in FIG. 4, only one of these might be used.

FIG. 4 shows two DRX cycles 410: a complete DRX cycle 410-1 and a partial DRX cycle 410-2. The DRX cycle 410-1 is described herein, and the other DRX cycle 410-2 is not described. Each DRX cycle 410 includes an onDuration (referred to also as an "on-duration") period 420 and an opportunity for DRX period 430: DRX cycle 410-1 includes an onDuration period 420-1 and an opportunity for DRX period 430-1; and DRX cycle 410-2 includes an onDuration period 420-2 and an opportunity for DRX period 430-2. The PDCCH monitoring 440 is illustrated, where a high level indicates PDCCH may be monitored, and a low level indicates PDCCH is not monitored and, instead, DRX opportunities are available.

This figure illustrates a frequency domain as frequency 450 and a time domain as time 455. The time-frequency resources 470 include resources in frequency 450 and in time 455. For the on-duration period 420-1, the UE 110 splits its search space 460 into five different search spaces: 460-1; 460-2; 460-3; 460-4; and 460-5. Note that having five search spaces 460 is merely exemplary, and a fewer or larger number of search spaces may be used.

One of the search spaces 460-1 is shown on the left-hand side, and the other search spaces 460 are assumed to be like this. The width 475 is in the frequency range 480, and is described in more detail below. The duration 476 is a period in time 455. The width 475 and duration 476 are created using certain of the time-frequency resources 470. The width 475 and duration 476 control a size 477 of a corresponding search space 460, and may be modified by, e.g., changing a number of resource blocks in frequency and/or a number of OFDM symbols in time, respectively. Periodicity resources 490 are illustrated and are described in more detail below.

It can be seen that the width 475 (as part of time-frequency resources 470) varies from larger (largest) at search space 460-1, to smaller at search space 460-2, . . . , to smaller (smallest) at search space 460-5. Thus, as in (a) above, there is a larger width 475 of frequency range 480 at the start of the on-duration period 420-1 that decreases over the time period of the on-duration period 420-1. This modification in width 475 of frequency range may be achieved via, e.g., modification of the CORESET configuration corresponding to each search space 460-x, where x=1, 2, 3, 4, or 5 in this example. For instance, the CORESET size 477 may be given by the number of OFDM symbols by the number of resource blocks, and changing these changes the duration 476 and width 475, respectively.

Also illustrates that time period $t_1$<time period $t_2$<time period $t_3$<time period $t_4$, which illustrates that there is a faster periodicity for the periodicity resources 490 in time (i.e., $t_1$ is the smallest) at the start in time of the on-duration period 420-1 and a slower periodicity or the periodicity resources 490 in time (i.e., $t_4$ is the largest) at the end in time of the on-duration period 420-1. The periodicity resources 490 define the periodicity (e.g., one or possibly more of the time periods t), which is a number of searches per unit of time. Consequently, as in (b) above, a faster periodicity occurs at the start in time of the on-duration period 420-1 and a slower periodicity is used over the time period of the on-duration period 420-1.

Turning to FIG. 4A, this figure illustrates the IE ControlResourceSet, which is used to configure a time/frequency control resource set (CORESET) in which to search for downlink control information. This version is from 3GPP TS 38.331 V16.2.0 (2020-09). FIG. 4B illustrates two ControlResourceSet field descriptions applicable to the exemplary embodiments herein. The duration field sets the "[c]ontiguous time duration of the CORESET in number of symbols", and therefore sets the duration 476. It is noted that the symbols are OFDM symbols, and each OFDM symbol corresponds to a particular time duration, as is known. The frequency domain resources field describes the "[f]requency domain resources for the CORESET." This may be used herein to adapt the width 475.

Figure 4C:
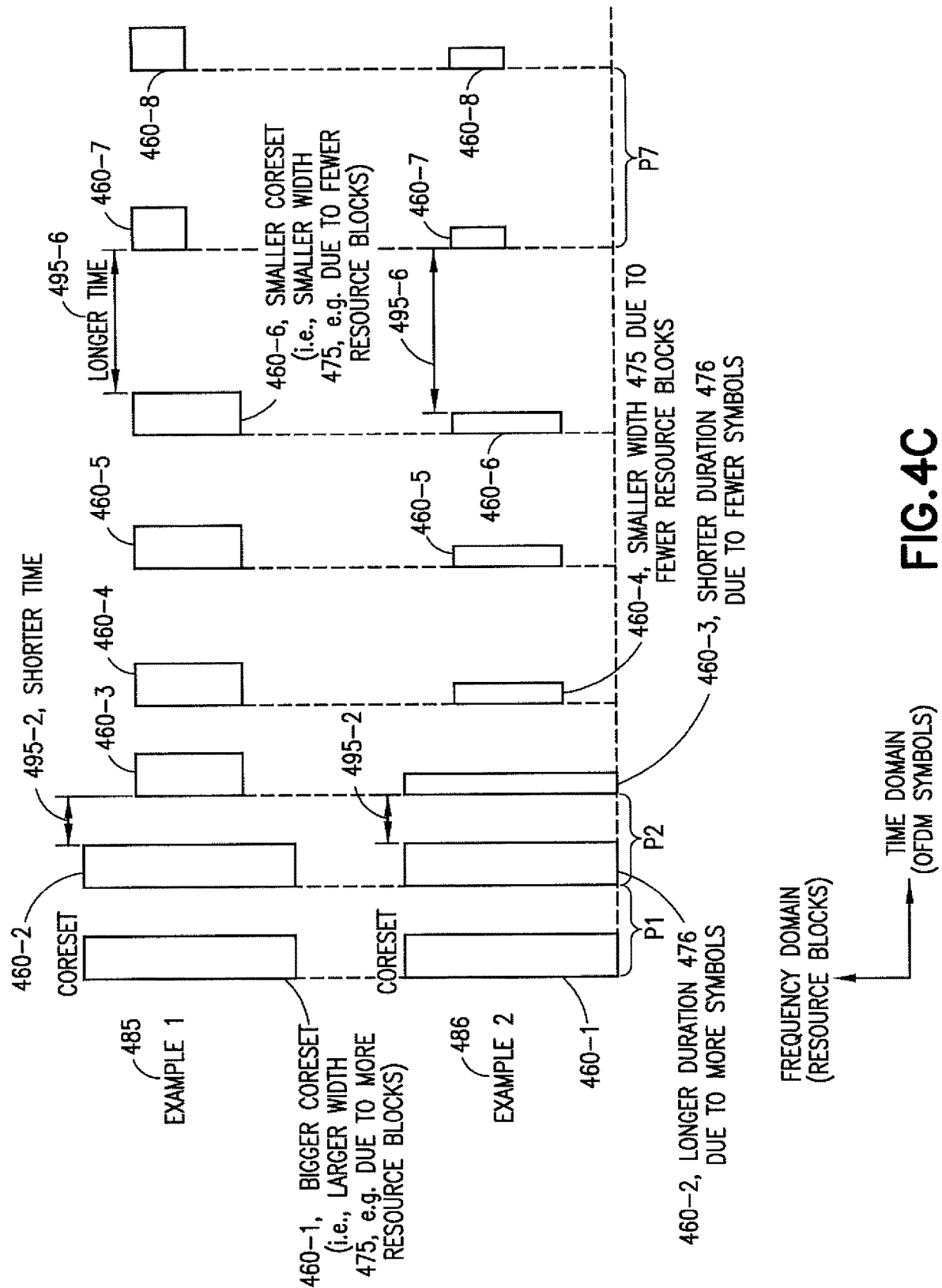
FIG. 4C is another illustration of search space and DRX cycle linking and modification in time and frequency domains for DRX cycles, in accordance with multiple exemplary embodiments.

Referring to FIG. 4C, this figure is another illustration of search space and DRX cycle linking and modification in time and frequency domains for DRX cycles, in accordance with multiple exemplary embodiments. This figure includes two examples 485 and 486. These are illustrated using a the frequency domain (e.g., frequency 450) of resource blocks and the time domain (e.g., time 455) Each example has seven periods $P_1, P_2, \ldots, P_7$, although only these three are indicated for ease of reference and clarity.

CORESETs are illustrated for each example 485, 486. Each CORESET corresponds to a search space 460, and each example 485, 486 has search spaces 460-1, 460-2, . . . , 460-8. Each period P in this example relates to a time period between starting points in time of two adjacent (in time) search spaces 460. There are two components of this, the duration 476 of each CORESET and the time 495 between each CORESET. For clarity, only times 495-2 and 495-6 are shown, though each period P has a corresponding time 495. The duration 476 can be adjusted via adjusting a number of symbols, in this case OFDM symbols, or other time resource in the time domain. The width 475 of a CORESET can be adjusted using resource blocks or other frequency resource in the frequency domain.

For example 1 485, the CORESETs for search spaces 460-1 and 460-2 are bigger CORESETs, i.e., having a larger width 475, e.g., due to more resource blocks in the frequency domain. Concerning periodicity resources 490 (see FIG. 4) and periods $P_1$ and $P_2$, these may be defined in part by the corresponding times 495-1 and 495-2. That is, the time 495 between CORESET occasions can be modified All periods P may be similarly adjusted, or may be adjusted via a starting location for each CORESET location (or periodicity) and by the duration 476 due to the number of symbols used. For the modification in example 1 485, the CORESETs and corresponding search spaces 460-3, 460-4, 460-5, and 460-6 have smaller CORESETs due to smaller width 475, in this example from fewer resource blocks. Similarly, the CORESETs and corresponding search spaces 460-3, 460-4, 460-5 have smaller CORESETs due to even smaller widths 475, from even fewer resource blocks. There is also a longer time 495-6 between the search space 460-6 and 460-7 and the corresponding CORESET occasions. In example 1 485, the duration 476 for each CORESET and corresponding search space does not change.

The example 2 486 illustrates that the first two CORESETs and corresponding search spaces 460-1 and 460-2 are longer in duration 476, due to more symbols as a time resource, and the CORESETs and corresponding search spaces 460-3, 460-4, 460-5 and 460-6 are shorter in duration 476 due to having fewer symbols allocated. The widths 475 for the two examples 485 and 486 are the same.

FIGS. 4D, 4E, and 4F illustrate the IE SearchSpace. This is from 3GPP TS 38.331 V16.2.0 (2020-09), and this TS says the IE SearchSpace "defines how/where to search for PDCCH candidates. Each search space is associated with one ControlResourceSet. For a scheduled cell in the case of cross carrier scheduling, except for nrofCandidates, all the optional fields are absent (regardless of their presence conditions)." FIG. 4G is also from 3GPP TS 38.331 and illustrates three SearchSpace field descriptions applicable to exemplary embodiments herein.

In 38.311, the search space definition is given in FIGS. 4D and 4E, with a release 16 addition in FIG. 4F. For the search space, the network tells the UE the first symbol in a slot for monitoring PDCCH (i.e. where a CORESET starts). The following may be used for this: monitoringSlotPeriodicityAndOffset; duration; and monitoringSymbolsWithinSlot. As illustrated in FIG. 4G, the monitoringSlotPeriodicityAndOffset field indicates "[s]lots for PDCCH Monitoring configured as periodicity and offset." The duration field contains a "[n]umber of consecutive slots that a SearchSpace lasts in every occasion." The monitoringSymbolsWithinSlot field indicates "The first symbol(s) for PDCCH monitoring in the slots configured for PDCCH monitoring (see monitoringSlotPeriodicityAndOffset and duration)."

Figure 5:
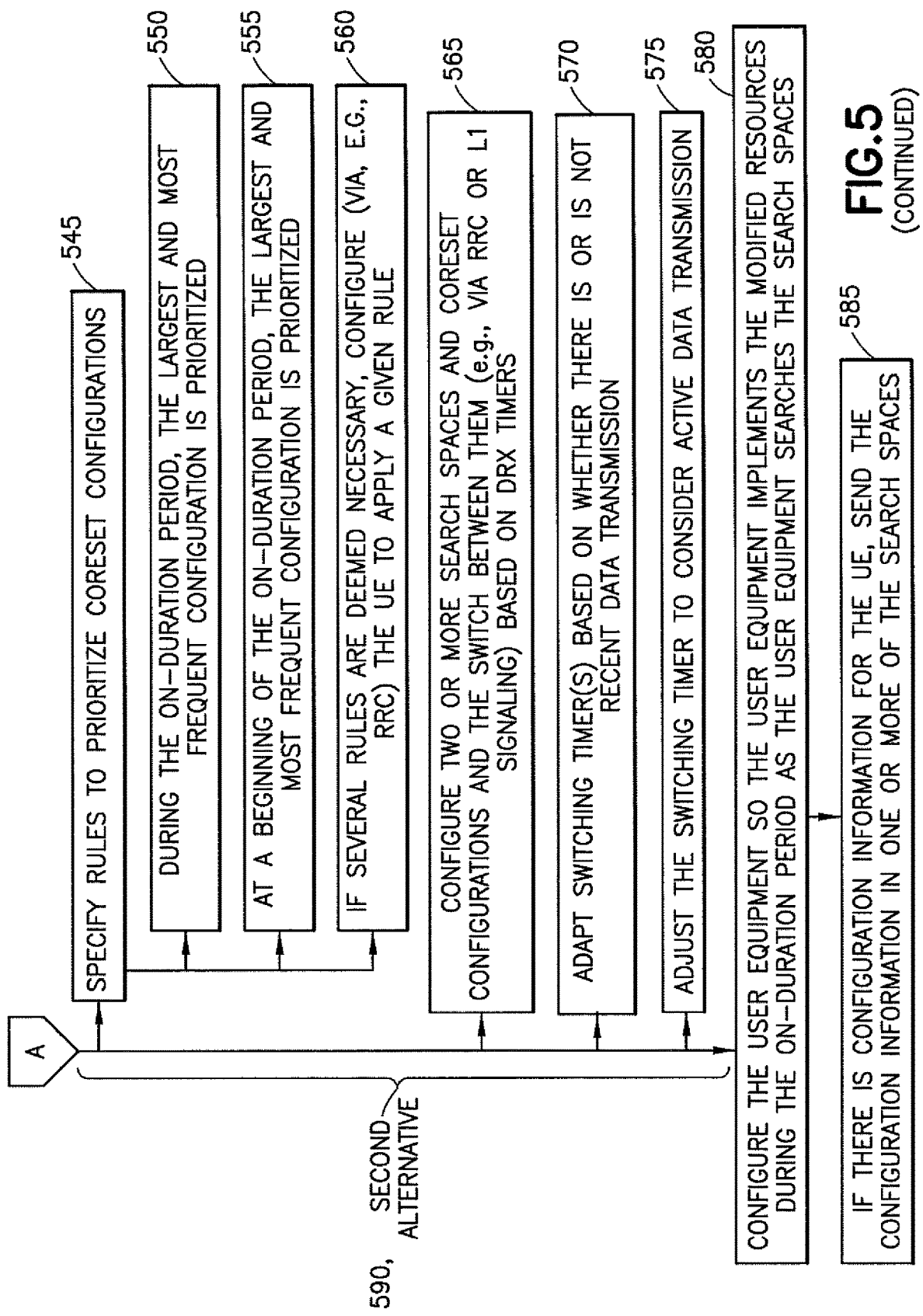
FIG. 5 is a logic flow diagram performed by a base station for search space and DRX cycle linking and modification, and illustrates the operation of an exemplary method or methods, a result of execution of computer program instructions embodied on a computer readable memory, functions performed by logic implemented in hardware, and/or interconnected means for performing functions in accordance with exemplary embodiments.

Exemplary embodiments are described using FIGS. 5 and 6. First, FIG. 5 is described, then FIG. 6 is described. FIG. 5 is a logic flow diagram performed by a base station for search space and DRX cycle linking and modification. This figure illustrates the operation of an exemplary method or methods, a result of execution of computer program instructions embodied on a computer readable memory, functions performed by logic implemented in hardware, and/or interconnected means for performing functions in accordance with exemplary embodiments. FIG. 5 is performed by a network node, such as a RAN node 170, e.g., a gNB 170, under control of the control module 150, at least in part.

FIG. 5 illustrates a first alternative 510 and a second alternative 590. In block 505, the network node links search spaces 460, used by a UE 110 to monitor 440 a control channel (e.g., PDCCH) for control information for the UE 110, to an on-duration period 420 of a discontinuous reception cycle 410. The resources, which are one or both of time-frequency resources 470 or periodicity resources 490, for the search spaces are modified via the linking over the on-duration period 420. That is, the time-frequency resources 470 change over time, as illustrated by FIG. 4.

For the first alternative 510, new rules (e.g., configuration and adaptation rules) can be specified to link the search space to, e.g., the DRX timers. See block 515. For example, the rules may include one or more of the following.

1) Specify (see block 520) CORESET configuration and adaptation rules. The configuration rules can set an initial configuration, and the adaptation rules determine how the initial configuration is adapted over time. For instance, specify predefined rules on CORESET time-frequency reduction (as an adaptation rule) as a function of the onDuration (say CORESET size reduction to ½ and ¼ after onDuration/2 and 3*onDuration/4 amount of time, respectively). See block 525. In these examples, the asterisk (*) indicates multiplication. In this example, the term "size" can include width 475 in frequency, duration 476 in time, or both.

Alternately, specify (see block 530) That the CORESET size remains the same, but the number of PDCCH candidates and blind decodes can be reduced as a function of time during the onDuration. In more detail, if the CORESET size remains the same, the number of candidates remains the same. However, UE can be instructed to only look at a subset of PDCCH candidates (i.e., a subset of blind decodes). Because CORESET can be shared among many UEs, other UEs can still take advantage of the PDCCH candidates not looked at by this UE. This has the effect of reducing time-frequency resources that will be searched for the search spaces.

2) Specify search space periodicity and adaptation rules, see block 535. For example, a gNB 170 may define different search space periodicity such as {2 ms, 5 ms, 10 ms, 20 ms} at {T, T+onDuration/4, T+onDuration/2, T+3*onDuration/4}, where T is the start of the ON period. See block 540. These rules affect the time periods t and the corresponding periodicity resources 490.

Another example is illustrated by block 543, where adaptation rules are adjusted to consider active data transmission. For example, if there is on-going data transmission, then perhaps a current adaptation rule or a least-limiting rule (e.g., largest width in frequency range and/or smallest period) would be chosen. This would keep the UE in a more frequent or larger search space longer.

For the second alternative 590, in case perfectly non-overlapping (e.g., in time or in time and frequency) search spaces and CORESET configurations are not possible, rules to prioritize the configurations could be introduced and specified (see block 545). For instance, during onDuration period 420, the largest and most frequent configuration could be prioritized. See block 550. Or, only at the beginning of ON-DURATION (up to, e.g., a time period set by a switching timer and/or number of subframes), is the largest and most frequent configuration prioritized. See block 555. If several rules are deemed necessary, the gNB 170 via RRC could configure the UE to apply a given rule. See block 560.

In yet another alternative, two or more search spaces and CORESET configurations may be configured and then switched between them (e.g., via RRC or L1 signaling) based on DRX timers. See block 565.

Another possible enhancement is to adapt switching timers (i.e., increase or decrease the value) based on whether there is or is not recent data transmission (as indicated for instance by the DRX inactivity timer). See block 570. Typically, these values are increased if there is data transmission, and decreased if there is not. The switching timers refer to the timers from block 555, e.g., timers used to switch from one CORESET configuration to another. One idea behind this is to keep a large and frequent CORESET as long as there is data activity.

Another option for the implicit link would be to adjust the switching timer to consider active data transmission. See block 575. For example, if there is on-going data transmission, then the timer value would be extended. This would keep the UE in a more frequent search space longer.

In block 580, the network node configures the UE 110 so the UE 110 implements the modified resources during the on-duration period as the UE searches the search spaces. In block 585, if there is configuration information for the UE 110, the network node sends the configuration information in one or more of the search spaces 460.

Turning to FIG. 6, this figure is a logic flow diagram performed by a user equipment for search space and DRX cycle linking and modification. This figure also illustrates the operation of an exemplary method or methods, a result of execution of computer program instructions embodied on a computer readable memory, functions performed by logic implemented in hardware, and/or interconnected means for performing functions in accordance with exemplary embodiments. The blocks in this flow diagram are performed by a UE 110, under control of the control module 140.

In block 605, the UE 110 receives configuration defined so the user equipment implements modification of resources during an on-duration period of a discontinuous reception cycle as the user equipment searches search spaces during the on-duration period. The resources are one or both of time-frequency resources or periodicity resources. One example of block 605 is block 610, where the UE receives configuration and adaptation rules from blocks 515, 520, 525, 530, 535, 540, and/or 543, as applicable.

The UE 110 in block 615 monitors the modified search spaces over the on-duration period, as the user equipment searches a control channel for control information in the on-duration period 420. Blocks 620 and 625 illustrate an example of this. In block 620, the UE sets resources of one or both of the time-frequency resources 470 or the periodicity resources 490 as per an initial configuration based on configuration rule(s). The UE 110 adapts, as per block 625, resources of one or both of the time-frequency resources 470 or periodicity resources 490 based on adaptation rule(s). In block 625, the UE 110, if there is configuration information for the UE, receives the configuration information in one or more of the search spaces.

It should be noted that FIG. 6 assumes it is the network that actually sets the rules, and the UE implements those rules. Therefore, under this assumption, the UE does not actually "modify" the search spaces, but instead searches based on the modifications the network has set for the search spaces over the DRX cycle.

Without in any way limiting the scope, interpretation, or application of the claims appearing below, a technical effect and advantage of one or more of the example embodiments disclosed herein is a potential use case for IoT (Internet of Things) UEs, where generally UEs are configured with long sleep times to save power (i.e. short on duration then long DRX). This means that data is more likely to arrive when UE is sleeping, so gNB will try to schedule UE at the beginning of the on-duration. Therefore, one needs to have a larger search space in the beginning to schedule UEs. Then, as the on-duration continues, the UE is less likely to have data, therefore the search space width and/or periodicity can be reduced to save UE power consumption. Although IoT is one possible use case, similar technical effects and advantages can occur any time DRX is used.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
AL Aggregation Level
AMF access and mobility management function
BA Bandwidth Adaptation
BS base station BWP bandwidth part
CCE control channel element
CORESET control resource set
CU central unit
DCI downlink control information
DL downlink
DMRS demodulation reference signal
DRX Discontinuous Reception
DU distributed unit
eMBB enhanced Mobile Broadband
eNB (or eNodeB) evolved (or enhanced) Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FR1 Frequency Range 1
FR2 Frequency Range 2
gNB (or gNodeB) base station for 5GNR, i.e., a node providing NR user plane and control plane protocol terminations towards the UE, and connected via the NG interface to the 5GC
IE information element
I/F interface
L1 layer 1, a physical layer, of a protocol stack
LTE long term evolution
MAC medium access control
MIB Master Information Block
MME mobility management entity
ms millisecond
ng or NG next generation
ng-eNB or NG-eNB next generation eNB
NR new radio
N/W or NW network
OFDM orthogonal frequency domain modulation
PDCP packet data convergence protocol
PDCCH Physical Downlink Control Channel
PHY physical layer
PRB Physical Resource Block
QPRS quadrature phase shift keying
RAN radio access network
REDCAP or RedCap Reduced Capability
REG resource element group
RF Radio Frequency
Rel release
RLC radio link control
RNTI Radio Network Temporary Identifier
RRH remote radio head
RRC radio resource control
RU radio unit
Rx receiver
SCS Subcarrier Spacing
SDAP service data adaptation protocol
SGW serving gateway
SI study item
SI-RNTI System Information Radio Network Temporary Identifier
SIB System Information Block
SIB1 System Information Block Type 1
SMF session management function
SSB Synchronization Signal Block
TS technical specification
Tx transmitter
UE user equipment (e.g., a wireless, typically mobile device)
UL Uplink
UPF user plane function
URLLC Ultra-Reliable, Low-Latency Communication

What is claimed is:

1. A method, comprising:

linking, by a network node in a wireless network, search spaces, used by a user equipment to monitor a control channel for control information for the user equipment, to an on-duration period of a discontinuous reception cycle, wherein resources of one or both of time-frequency resources or periodicity resources for the search spaces are modified via the linking over the on-duration period, wherein the on-duration period is a duration in the discontinuous reception cycle that the user equipment waits to receive transmission on one or more physical downlink control channels; and configuring, by the network node, the user equipment so the user equipment implements the modified resources, including corresponding modification of resources of one or both of time-frequency resources or periodicity resources for the search spaces, during the on-duration period as the user equipment searches the search spaces.

2. The method of claim 1, wherein:

the linking further comprises specifying one or more rules to link the search spaces to the on-duration period; and the configuring comprises sending by the network node indication of the one or more rules to link the search spaces to the on-duration period toward the user equipment.

3. The method of claim 1, wherein:

the linking comprises specifying one or more rules to prioritize control resource set configurations; and the configuring comprises configuring the user equipment with the control resource set configurations based on the specified one or more rules.

4. The method of claim 1, wherein:

the linking further comprises configuring two or more search spaces and control resource set configurations; and the configuring, by the network node, the user equipment comprises switching between the two or more search spaces and the control resource set configurations based on one or more timers.

5. A method, comprising:

receiving configuration, at a user equipment and from a base station in a wireless network, defined so the user equipment implements modification of resources during an on-duration period of a discontinuous reception cycle as the user equipment searches search spaces during the on-duration period, wherein the resources are one or both of time-frequency resources or periodicity resources wherein the on-duration period is a duration in the discontinuous reception cycle that the user equipment waits to receive transmission on one or more physical downlink control channels; and monitoring by the user equipment the modified search spaces, including corresponding modification of resources of one or both of time-frequency resources or periodicity resources for the search spaces, over the on-duration period, as the user equipment searches a control channel for control information.

6. An apparatus, comprising:

at least one processor; and at least one memory storing instructions that, when executed by the at least one processor, to cause the apparatus at least to perform:

linking, by a network node in a wireless network, search spaces, used by a user equipment to monitor a control channel for control information for the user equipment, to an on-duration period of a discontinuous reception cycle, wherein resources of one or both of time-frequency resources or periodicity resources for the search spaces are modified via the linking over the on-duration period, wherein the on-duration period is a duration in the discontinuous reception cycle that the user equipment waits to receive transmission on one or more physical downlink control channels; and configuring, by the network node, the user equipment so the user equipment implements the modified resources, including corresponding modification of resources of one or both of time-frequency resources or periodicity resources for the search spaces, during the on-duration period as the user equipment searches the search spaces.

7. The apparatus of claim 6, wherein:
the linking further comprises specifying one or more rules to link the search spaces to the on-duration period; and
the configuring comprises sending by the network node indication of the one or more rules to link the search spaces to the on-duration period toward the user equipment.

8. The apparatus of claim 7, wherein specifying one or more rules to link the search spaces to the on-duration period comprises specifying one or more control resource set configuration and adaptation rules.

9. The apparatus of claim 8, wherein the specified one or more control resource set configuration and adaptation rules are one or more rules on control resource set configuration for time-frequency reduction as a function of the on-duration period.

10. The apparatus of claim 7, wherein specifying one or more rules comprises adjusting one or more adaptation rules to consider active data transmission.

11. The apparatus of claim 6, wherein:
the linking comprises specifying one or more rules to prioritize control resource set configurations; and
the configuring comprises configuring the user equipment with the control resource set configurations based on the specified one or more rules.

12. The apparatus of claim 11, wherein specifying one or more rules to prioritize control resource set configurations further comprises one or more of the following: during the on-duration period, a largest and most frequent configuration is prioritized; at a beginning of the on-duration period, the largest and most frequent configuration is prioritized; or in response to several rules being deemed necessary, configuring by the network node the user equipment to apply a given one of the one or more rules.

13. The apparatus of claim 6, wherein:
the linking further comprises configuring two or more search spaces and control resource set configurations; and
the configuring, by the network node, the user equipment comprises switching between the two or more search spaces and the control resource set configurations based on one or more timers.

14. The apparatus of claim 6, wherein the linking further comprises adapting switching one or more timers based on whether there is or is not recent data transmission.

15. The apparatus of claim 6, wherein the linking further comprises adjusting a switching timer to consider active data transmission.

16. An apparatus, comprising:
at least one processor; and
at least one memory storing instructions that, when executed by the at least one processor, to cause the apparatus at least to perform:
receiving configuration, at a user equipment and from a base station in a wireless network, defined so the user equipment implements modification of resources during an on-duration period of a discontinuous reception cycle as the user equipment searches search spaces during the on-duration period, wherein the resources are one or both of time-frequency resources or periodicity resources, wherein the on-duration period is a duration in the discontinuous reception cycle that the user equipment waits to receive transmission on one or more physical downlink control channel; and
monitoring by the user equipment the modified search spaces, including corresponding modification of resources of one or both of time-frequency resources or periodicity resources for the search spaces, over the on-duration period, as the user equipment searches a control channel for control information.

17. The apparatus of claim 16, wherein:
the receiving configuration comprises receiving indication of one or more rules to link the search spaces to the on-duration period; and
the monitoring comprises monitoring by the user equipment the search spaces that are modified based on the one or more rules over the on-duration period.

18. The apparatus of claim 17, wherein receiving indication of the one or more rules comprises receiving indication of one or more search space periodicity and adaptation rules.

19. The apparatus of claim 18, wherein the one or more search space periodicity and adaptation rules define different search space periodicity at different times during the on-duration period.

20. The apparatus of claim 17, wherein:
the receiving configuration comprises receiving one or more adaptation rules to consider active data transmission; and
the monitoring by the user equipment the modified search spaces over the on-duration period comprises monitoring the search spaces that are modified based on the one or more adaptation rules and considering active data transmission.

* * * * *